United States Patent
Chion et al.

(10) Patent No.: US 8,428,042 B1
(45) Date of Patent: Apr. 23, 2013

(54) FEEDBACK MECHANISMS FOR MULTICAST/BROADCAST SERVICE IN WIRELESS COMMUNICATION NETWORKS

(75) Inventors: Mary Chion, Belle Mead, NJ (US); Yonggang Fang, San Diego, CA (US)

(73) Assignee: ZTE (USA) Inc., Morristown, NJ (US)

( * ) Notice: Subject to any disclaimer, the term of this patent is extended or adjusted under 35 U.S.C. 154(b) by 492 days.

(21) Appl. No.: 11/329,916

(22) Filed: Jan. 10, 2006

Related U.S. Application Data (60) Provisional application No. 60/642,898, filed on Jan. 10, 2005.

(51) Int. Cl.
*H04B 7/212* (2006.01)

(52) U.S. Cl.
USPC ........... 370/347; 370/208; 370/330; 370/332; 455/423; 455/452.1; 455/67.11

(58) Field of Classification Search ............ 370/347, 370/345, 312, 329, 331, 332, 330; 455/423, 455/425, 452.1–452.2, 67.11–67.16
See application file for complete search history.

(56) References Cited

U.S. PATENT DOCUMENTS

| | | | | |
|---|---|---|---|---|
| 6,741,554 | B2* | 5/2004 | D'Amico et al. | 370/225 |
| 7,284,127 | B2* | 10/2007 | Gehrmann | 713/169 |
| 2002/0165985 | A1* | 11/2002 | Chen et al. | 709/245 |
| 2004/0176094 | A1* | 9/2004 | Kim et al. | 455/438 |
| 2004/0248603 | A1* | 12/2004 | Canoy | 455/513 |
| 2005/0058151 | A1* | 3/2005 | Yeh | 370/445 |
| 2005/0138671 | A1* | 6/2005 | Love et al. | 725/123 |
| 2006/0140186 | A1* | 6/2006 | LoGalbo et al. | 370/390 |

OTHER PUBLICATIONS

Junhyung Kim, Pred-defined Burst Profile information, Nov. 1, 2004, IEEE 802.16 Broadband Wireless Working Group, pp. 1-2.*

IEEE 802.16-2004, "IEEE Standard for Local and Metropolitan Area Networks, Part 16: Air Interface for Fixed Broadband Wireless Access Systems," Oct. 1, 2004, 895 pages.

IEEE 802.16e-2005, "IEEE Standard for Fixed and Mobile Broadband Wireless Access Systems, Part 16: Air Interface for Fixed and Mobile Broadband Wireless Access Systems and Amendment 2: Physical and Medium Access Control Layers for Combined Fixed and Mobile Operation in Licensed Bands and Corrigendum 1," Feb. 18, 2006, 864 pages.

IEEE P802.16-REVd/D5-2004, " Draft IEEE Standard for Local and metropolitan area networks, Part 16: Air Interface for Fixed Broadband Wireless Access Systems," May 13, 2004, 915 pages.

* cited by examiner

*Primary Examiner* — Marcos Torres
(74) *Attorney, Agent, or Firm* — Perkins Coie LLP (57) ABSTRACT

Efficient uplink feedback mechanisms from subscriber stations to a base station involved in a multicast/broadcast service (MBS) to report channel conditions at the subscriber stations to the base stations in order to select a suitable burst profile in transmitting MBS data by the base station in OFDM and OFDMA wireless communication systems.

20 Claims, 7 Drawing Sheets

FEEDBACK MECHANISMS FOR MULTICAST/BROADCAST SERVICE IN WIRELESS COMMUNICATION NETWORKS

This application claims the benefit the U.S. Provisional Application No. 60/642,898 entitled "FEEDBACK MECHANISMS FOR THE MULTICAST/BROADCAST SERVICE (MBS) FOR WIRELESS COMMUNICATION NETWORKS" and filed Jan. 10, 2005.

BACKGROUND

This application relates to wireless communication systems and techniques based on orthogonal frequency division multiplexing (OFDM) and orthogonal frequency division multiple access (OFDMA), and the multicast/broadcast services over OFDM/OFDMA wireless networks.

Wireless communication systems use electromagnetic waves to communicate with wireless communication devices located within cells of coverage areas of the systems. A radio spectral range or band designated or allocated for a wireless communication service or a particular class of wireless services may be divided into different radio carrier frequencies for generating different communication frequency channels. This use of different frequencies for different communication channels may be used in various multiple access radio wireless communication systems.

OFDM and OFDMA systems generate different channels within a given band by using the orthogonal frequency division multiplexing to generate channel spectral profiles that are orthogonal to one another without interference when different channels are centered at selected equally-spaced frequencies. Under the OFDM, the frequency spacing can be smaller than the minimum spacing in conventional channels and hence increase the number of channels within a given band. The existing and developing specifications under IEEE 806.16x standards support wireless communications under OFDM and orthogonal frequency division multiple access (OFDMA). The drafts for IEEE 806.16 published in January 2004 and revised in December 2005 (802.16d/Corl revision D5 and 802.16e revision D12) provide detailed technical specifications for OFDM and OFDMA wireless systems.

Similar to other wireless communication systems, OFDM and OFDMA wireless systems support point-to-point transmission of data where a base station (BS) transmits data to a subscriber station (SS) via a downlink traffic channel on a per burst basis. To obtain optimal system performance, the BS selects the best burst profile at each transmission time based on a channel condition feedback sent by the SS. A burst profile is a set of parameters that describes transmission properties and may include parameters such as the modulation type, forward error correction (FEC) type, etc.

In addition to the point-to-point transmission, OFDM and OFDMA wireless systems may also be configured to support Multicast/Broadcast service (MBS) that allows for unidirectional point-to-multipoint transmission of multimedia data (e.g. text, audio, picture, video) from a single source point to a multicast group of multiple receivers in a multicast area. As an example, the text data in MBS may include weather forecast information, traffic reports, and short messages. In some implementations, OFDM and OFDMA wireless systems may be configured to support MBS data transmission on the downlink. Data for a MBS connection is transmitted by the BS over a single shared traffic channel and received by multiple SSs.

In MBS, different SSs receive the single MBS channel and may experience different receiving conditions. Hence, for the same MBS channel, different receiving SSs may experience different bit errors. Unlike the point-to-point transmission, the nature of the MBS does not allow for error connection via automatic repeat request (ARQ) or hybrid ARQ for individual receiving SSs. Therefore, there is a need for an efficient feedback mechanism in the uplink from each SS to the BS in a MBS connection to allow the BS to configure the burst profile of the downlink MBS connection with sufficient large downlink transmission capacity and reduced latency while maintaining the bit errors within the acceptable level for the MBS service.

SUMMARY

The wireless communication systems and techniques described in this application provide a channel condition feedback from each of the multiple SSs involved in a MBS service so that the BS can select a suitable burst profile for the MBS data transmission. The implementations of the channel condition feedback can be configured to conserve the uplink bandwidth.

This application includes two examples of feedback mechanism used by the subscriber stations involved in MBS connection to provide channel condition reporting to the BS. With these mechanisms, the BS can obtain information regarding SSs' downlink channel conditions and are able to select an optimal burst profile for MBS data transmission. Moreover, both mechanisms are designed with much smaller uplink bandwidth requirement comparing to the unicast feedback method defined in IEEE 802.16 standard.

The first mechanism is a NACK ("negative acknowledgment") based fast feedback method. In one implementation of the NACK based fast feedback, a SS participating in a MBS connection sends NACK indication over a dedication MBS Feedback channel when the SS fails to receive a scheduled MBS data burst. The BS calculates the percentage of NACK received after each MBS data burst transmission and selects a less or more robust burst profile based on the NACK percentage.

The second mechanism is a burst profile based slow feedback method. In one implementation of this second mechanism, the SS determines its preferred burst profile based on the measured downlink channel condition and a set of thresholds given by the BS. When the preferred burst profile is more robust than the burst profile used by the MBS connection, the SS reports its preferred burst profile to the BS through a MAC management message or a special MAC header, MBS Burst Profile Feedback. The BS performs a slow burst profile adjustment based on the feedback from the SS, in which, the BS selects a less robust burst profile with a higher data rate if it does not receive any burst profile report after a duration N; otherwise, the BS updates the burst profile with a lower data rate according to on MBS Burst Profile Feedbacks from SSs.

Various additional examples are described. In one example, a described method for providing a multicast/broadcast service (MBS) in a wireless OFDM/OFDMA system includes causing a subscriber station to generate a negative acknowledgement (NACK) indication when the subscriber station fails to receive a scheduled MBS data burst from the base station; and providing an uplink communication channel for the subscriber station to transmit the NACK indication to the base station which processes the NACK indication in determining a burst profile to be used in a subsequent MBS transmission to the subscriber station.

In another example, a method for providing a multicast/broadcast service (MBS) in a wireless OFDM/OFDMA system is described to include causing a base station, that sends a MBS transmission to a plurality of subscriber stations, to receive uplink signals from the subscriber stations and to detect a negative acknowledgement (NACK) indication from each subscriber station which is generated when the subscriber station fails to receive a scheduled MBS data burst from the base station. This method further includes causing the base station to process received NACK indication from each subscriber station in determining a burst profile to be used in a subsequent MBS transmission to the subscriber stations.

In yet another example, a method for providing a multicast/broadcast service (MBS) in a wireless OFDM/OFDMA system is described to include causing each of a plurality of subscriber stations receiving a MBS downlink signal from a base station to monitor a downlink channel condition of the received MBS downlink signal; causing each subscriber station to determine a preferred burst profile for the MBS downlink signal according to the downlink channel condition at each subscriber station; and, when the preferred burst profile determined by a subscriber station is more robust than a burst profile used by the base station in transmitting the MBS downlink signal, causing the subscriber station to generate and send a MAC header or message to the base station to inform the base station of the more robust burst profile preferred by the subscriber station. In this method, the subscriber station does not generate and send the MAC header or message when the preferred burst profile determined by a subscriber station is less robust than the burst profile used by the base station in transmitting the MBS downlink signal.

In yet another example, a method for providing a multicast/broadcast service (MBS) in a wireless OFDM/OFDMA system includes causing a base station, that sends a MBS transmission to a plurality of subscriber stations, to receive uplink signals from the subscriber stations and to detect a MAC header or message from each subscriber station which is generated by a subscriber station when a bust profile for the MBS transmission preferred by the subscriber station is more robust than a burst profile used by the base station in the MBS transmission. The MAC header or message includes an index representative of the preferred burst profile without having all data of the preferred profile. In response to at least one received MAC header or message, the base station changes the burst profile in a subsequent MBS transmission.

Communication systems that implement the described techniques are also disclosed. In one example, a system includes a MBS scheduler which may be installed in a base station controller, and a MBS server which may be installed in an access network gateway that is connected to the carrier IP network. The system may further include other MBS components such as a MBS controller, a MBS content sever, and a MBS subscriber database.

Exemplary implementations and various features of the two feedback mechanisms are now described in greater detail in the attached drawings, the detailed description, and the claims.

DETAILED DESCRIPTION

In a MBS service, a serving BS needs to select an optimal burst profile for the downlink MBS channel to accommodate for different receiving conditions at different receiving SSs. The downlink MBS burst profile may be in various forms. As a specific example, the Downlink Interval Usage Code (DIUC) in the IEEE 802.16 includes the modulation and coding scheme of the downlink channel and can be used the downlink burst profile. Without a channel condition feedback from each of the SS involved in the MBS service, the BS faces a dilemma in selecting the burst profile for downlink MBS data transmission. On one hand, the BS needs to select the most robust burst profile with a relatively low data rate to ensure the delivery of data and this can greatly reduce the downlink capacity and increase the latency in the over the air transmission. On the other hand, the BS may attempt to increase the downlink capacity and reduce the latency by using a less robust burst profile with a relatively high data rate. The less robust burst profile may cause service outages of some SSs involved in the MBS service. The feedback from each SS involved in the MBS service allows the BS to dynamically select a burst profile that meets the robust requirements for one or more SSs that experience the relatively difficult receiving conditions while providing a relatively high data rate for one or more SSs that experience better receiving conditions.

Figure 1:
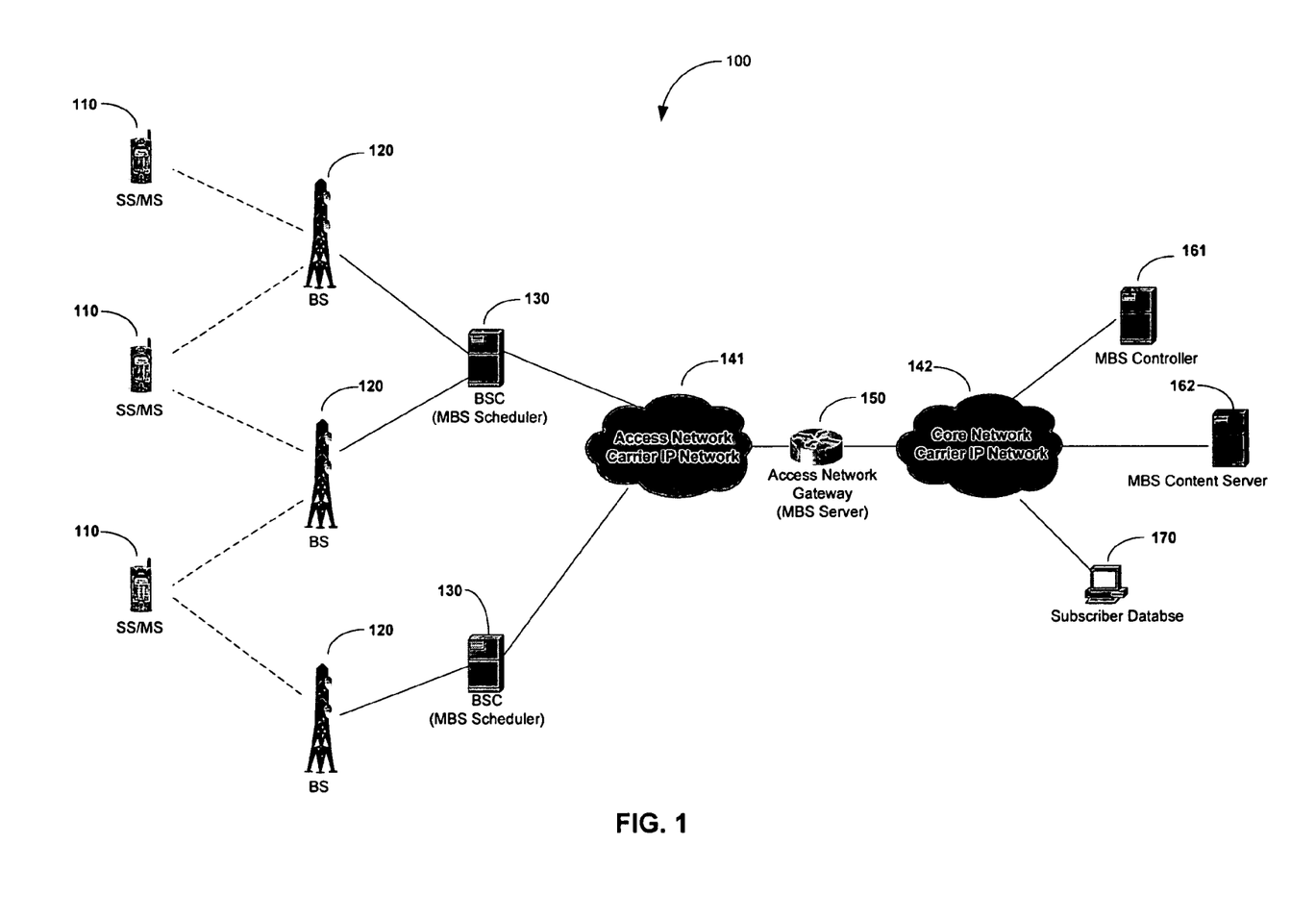
FIG. 1 shows an example of an OFDM/OFDMA wireless communication system in which MBS service can be supported.

FIG. 1 illustrates an exemplary OFDM and OFDMA wireless communication system 100 with added network elements that are used to support MBS services. The system 100 may include a network of base stations (BSs) 120 that are spatially distributed in a service area to form a radio access network for wireless subscriber stations (SSs) 110. A SS 110 may be any communication device capable of wirelessly communicating with base stations 120 and may be implemented as a mobile SS or a fixed SS which may be relocated within the system. Examples of a stationary wireless device may include desktop computers and computer servers. Examples of a mobile wireless device (i.e., a MSS) may include mobile wireless phones, Personal Digital Assistants (PDAs), and mobile computers.

A base station 120 in the system 100 is a radio transceiver that is conceptually at a center of a cell and wirelessly communicates with a SS in the cell via downlink radio signals. Each BS 120 may be designed to have directional antennas and to produce two or more directional beams to further divide'each cell into different sections. Base station controllers (BSCs) 130 are provided in the system 100 to control the BSs 120. Each BSC 130 is connected to a group of two or more two or more designated BSs 120 and controls the connected BSs 120. In some implementations that support MBS services, a BSC 130 may include a MBS scheduler functional entity that schedules air link resources used by MBS connections at multiple BSs 120.

The BSCs 130 are connected to a carrier IP network which carries, among other data, various data for the MBS services. As one specific example, the system 100 in FIG. 1 shows a carrier IP network that includes an access network 141 and a core network 142 and enables MBS services. As illustrated, an access network gateway (AGW) 150 may be used to provide an interface between the access network's carrier IP network 141 and the core network's carrier IP network 142. The AGW 130 may include a MBS server functional entity which manages the MBS zone assignments for its controlled BSs. A MBS zone is a group of BSs for which a certain set of MBS services are valid. In addition, the MBS server 150 may also perform authorization and encryption key management for the MBS connections in some implementations. The system 100 may also include other network elements in the core network 142 for the MBS support, such as a MBS controller 161, a MBS content server 162 and a MBS Subscriber Database 170.

Figure 2:
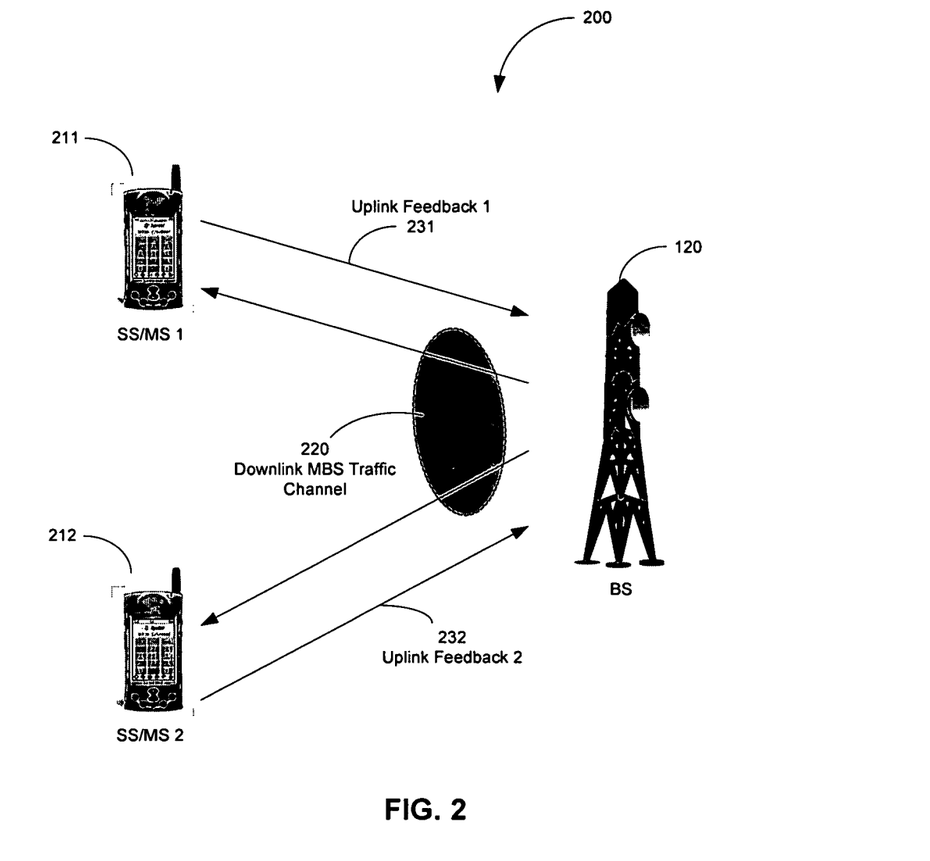
FIG. 2 illustrates an example of the air link structure for a MBS connection for the wireless communication system in FIG. 1.

FIG. 2 illustrates an exemplary air link structure for a MBS connection over the wireless system 100 in FIG. 1. A MBS connection carries multicast/broadcast information in the downlink direction to a group of SSs 211 and 212 from the BS 120. The BS 120 transmits MBS data via a MBS downlink traffic channel 220 to, e.g., both the SS1 211 and SS2 212 which receive and decode same MBS downlink traffic channel 220. Each of the subscriber stations SS1 211 and SS2 212 also independently measures its downlink channel and provides the channel condition feedback to the BS 120 via an uplink feedback channel, e.g., the feedback1 221 for the SS 211 and the uplink feedback2 222 for the SS 212. The BS 120 selects burst profile for downlink MBS traffic channel 220 based on the channel condition feedbacks received from SS1 211 and SS2 212. The burst profile may be selected to meet a specific set of system performance requirements, e.g., minimum tolerable service outage for MBS service, maximum bandwidth allocation, etc. A more robust burst profile provides a larger coverage area for the downlink data transmission at the expense of the air link bandwidth because a more robust burst profile has a lower transmission data rate. A less robust profile can improve air link capacity but with a higher chance of causing a service outage for a SS that is further away from the BS. The burst profile selection algorithm is one of the essential procedures used by the wireless network operator to adjust the system performance. Without the channel condition feedback from the SS, it is difficult for the BS to select an optimal burst profile for transmission. However, due to the nature of MBS connection where a large group of SSs are usually involved, an effective feedback mechanism is necessary to conserve the uplink capacity. Two examples of feedback mechanisms are detailed in the following sections.

The first feedback mechanism is the NACK based fast feedback in which the SS sends a negative acknowledgement (NACK) when it fails to decode a scheduled MBS data burst on a MBS connection. Accordingly, a designated feedback channel is generated in the uplink to carry NACK indications. In implementing this feedback mechanism, each SS does not need to send measured actual downlink channel information such as the received Carrier-to-Interference-and-Noise-Ratio (CINR). The SS simply sends the NACK indication if necessary to reduce the number of feedback bits required since most systems are engineered with a low service outage percentage.

Figure 3:
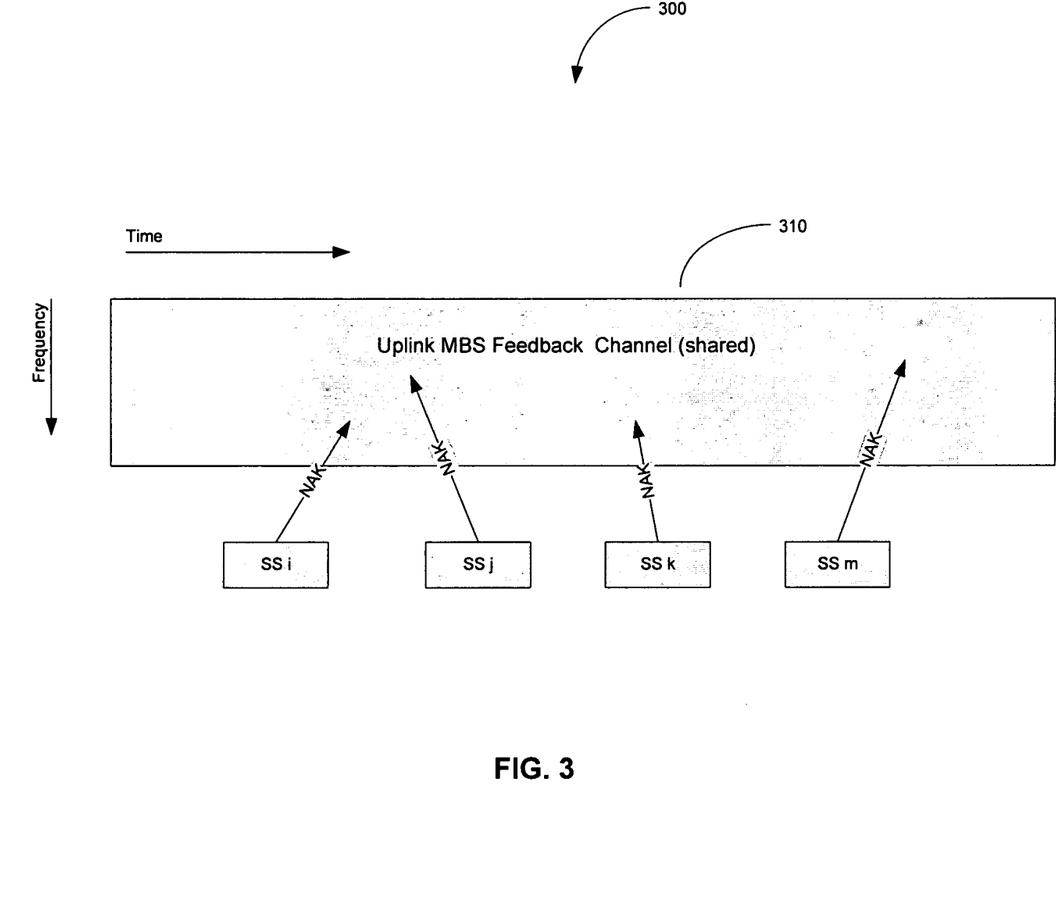
FIG. 3 shows an example of the dedicated uplink MBS Feedback channel used by SSs to report NACK indication to the BS for a MBS connection.

FIG. 3 shows an Uplink MBS Feedback channel 310 carrying NACK indications from the SSs participating in a MBS connection. The Uplink MBS Feedback channel 310 is shared by all SSs for transmitting the NACK indication. The manner in which the Uplink MBS Feedback channel is shared depends on the specific implementation. The capacity of an Uplink MBS Feedback channel 310 can be scalable in either or both of the time domain and the frequency domain to accommodate the number of SSs participating in the MBS service. Specific algorithms can be designed to dynamically adjust the capacity of Uplink MBS Feedback channel 310 based on the number of users involved in a MBS connection. There is one dedicated Uplink MBS Feedback channel per MBS connection. Moreover, the Uplink MBS Feedback channel may not be continuously active in the time domain. For example, a BS may have multiple Uplink MBS Feedback channels with each assigned to a MBS connection and each of the Uplink MBS Feedback channel is only active at the frame immediately after the MBS data burst transmission of the corresponding MBS connection.

Figure 4:
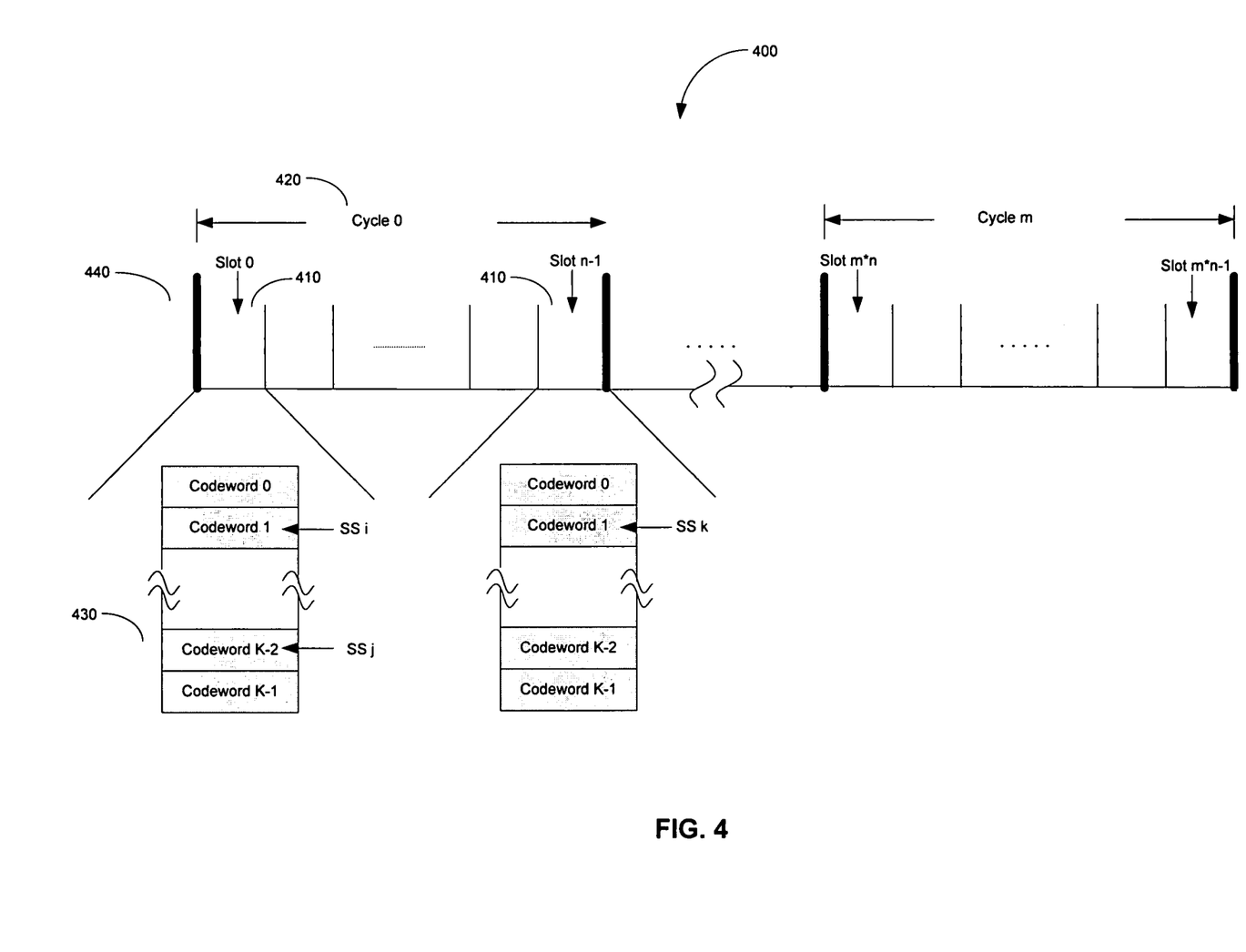
FIG. 4 illustrates one example of a sharing mechanism of the MBS Feedback channel by multiple SSs according to one exemplary implementation.

FIG. 4 illustrates the sharing mechanism of the MBS Feedback channel by multiple SSs according to one exemplary implementation. The Uplink MBS Feedback channel 440 is divided into consecutive slots 410 in the time domain (e.g. each slot can be 2 OFDMA symbols long). Every n consecutive slots are grouped together to form a cycle 420. To reduce collision of NACK transmission from multiple SSs, the SSs using this MBS feedback channel 440 are evenly assigned into one of the n slots 410 in a cycle 420 by a specific algorithm such as a hashing algorithm using MAC addresses of the SSs. Furthermore, a set of K codewords 430 is transmitted over the Uplink MBS Feedback channel at each slot 410. The codewords in the set of K codewords 430 are orthogonal to one other and this orthogonality allows for transmission collision into one slot. A SS transmits one of the codewords during its assigned slot when it needs to send a NACK to the BS. There are various algorithms for the SS to select a codeword for transmission, e.g., randomly select a codeword from the pool of K codewords or using a hashing algorithm to hash to a codeword. The BS should be able to decode multiple codewords in one slot. To ensure the accuracy of NACK statistics, the length of the cycle in FIG. 4 may be designed to be no longer than a physical layer frame.

Figure 5:
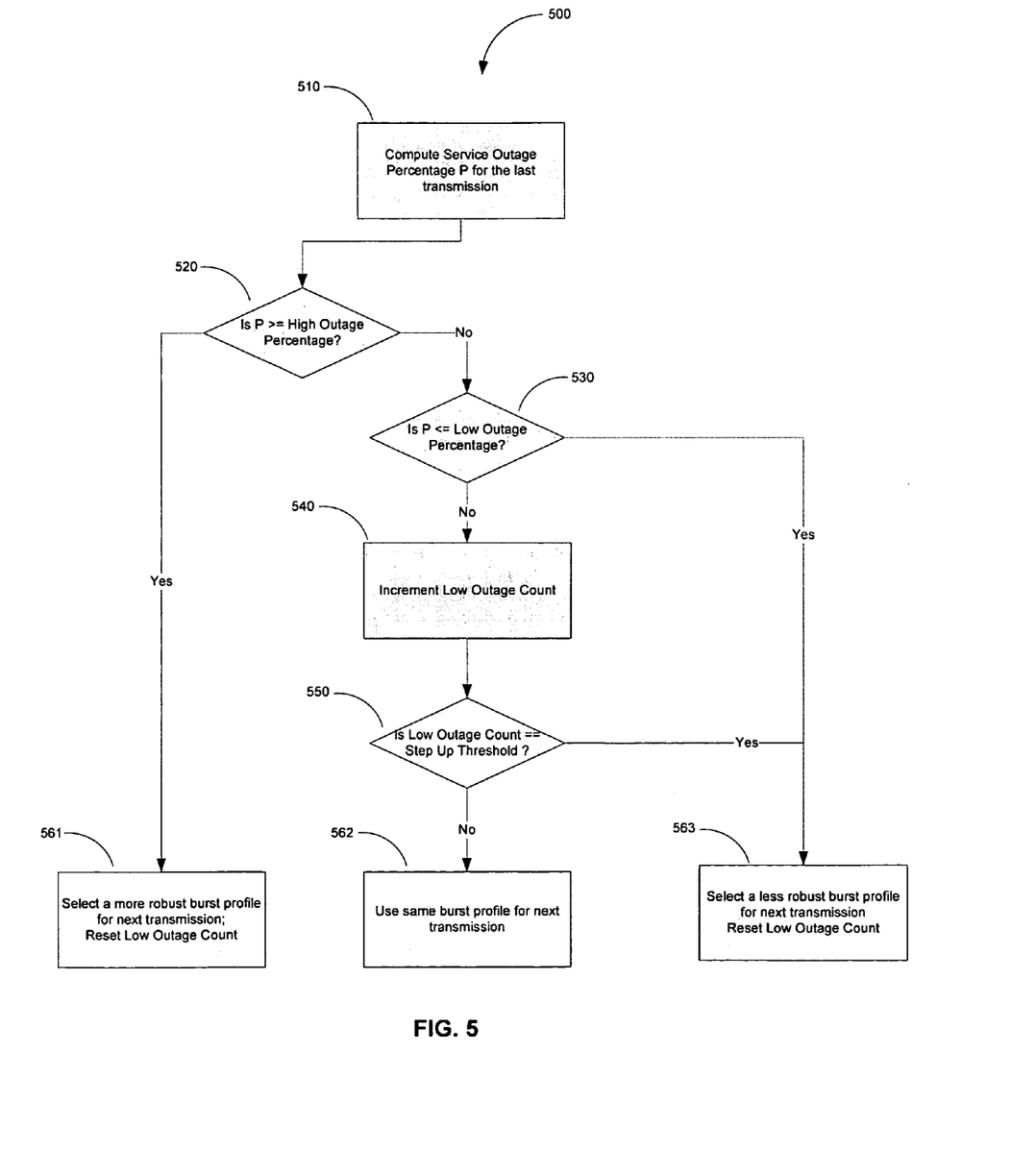
FIG. 5 illustrates one example of the procedure for a BS to select an optimal MBS burst profile based on NACKs received over MBS Feedback channel according to an exemplary implementation.

FIG. 5 illustrates one exemplary procedure for a BS to select an optimal MBS burst profile based on NACKs received over MBS Feedback channel according to an exemplary implementation. After each MBS data burst transmission, the BS collects all possible NACK feedbacks, e.g. by listening to an entire cycle of MBS Feedback Channel. At step 510, the BS calculates Service Outage Percentage P, $$P=((NUM\_NACK)/(NUM\_SS))*100$$

where NUM_NACK is the total number of NACKs received after a MBS data burst transmission and NUM_SS is the total number of SSs subscribed to the MBS service in this BS.

Next at step 520, P is compared to a threshold High Outage Percentage. High Outage Percentage is defined as the maximum allowed service outage ratio for a particular MBS service. If P is greater or equal to High Outage Percentage, as indicated in step 561, the BS proceeds to select a more robust burst profile in order to reduce current Service Outage Percentage. If P is smaller than High Outage Percentage, P is further compared to Low Outage Percentage, as shown in step 530.

Low Outage Percentage is the threshold used to indicate the coverage region for the MBS connection is unnecessarily large and it can be reduced in order to conserve downlink bandwidth. If P is lower or equal to Low Outage Percentage, the BS performs operation described in step 563 which selects a less robust burst profile to improve the bandwidth efficiency at the cost of a reduced coverage region. If P is higher than Low Outage Percentage, the BS increments a Low Outage Count (step 540). The Low Outage Count is a counter that is reset when the burst profile is changed. Low Outage Count is compared with Step Up Threshold, as indicated in step 550. Step Up Threshold is the minimum number of consecutive MBS data bursts received successfully before a burst profile change can be made. A MBS data burst is said to be received successfully if P is lower than High Outage Percentage. If Low Outage Count is less than Step Up Threshold, the burst profile remains unchanged (step 562). If Low Outage Count equals to Step Up Threshold, the operations in step 563 is carried out. Step Up Threshold along with Low Outage Count allows the BS to slowly adjust the burst profile until an optimal one is reached.

In the above feedback mechanism, the processing of the feedbacks from different SSs is entirely handled by the BS and each SS is simply programmed to send out the NACK indication whenever a scheduled MBS data burst is not received. The following sections describe a second feedback mechanism, a burst profile based slow feedback method, where each SS is assigned with a more active role in selecting the burst profile used by the BS.

In this second feedback mechanism, the BS starts the MBS transmission with a pre-determined initial burst profile (e.g., an initial DIUC). The SS reports its preferred burst profile to the BS through a MAC (medium access control) management message or a special MAC header, MBS Burst Profile Feedback. The SS monitors the downlink channel condition and decides its preferred burst profile based on its measurement. The SS only reports its preferred burst profile to the BS if its preferred burst profile is more robust than the one used by the MBS connection. The BS may change the burst profile to a less robust one (with a higher data rate) if there is no MBS Burst Profile Feedback received for a certain number (N) of consecutive MBS data bursts. The value of N may be fixed in some implementations or configurable in other implementations and can be used to fine tune the system performance. When the BS receives a MBS connection feedback from a BS, the BS uses the burst profile as indicated in the MBS connection feedback. If multiple MBS Connection Feedbacks are received, the BS may be controlled to use the most robust burst profile obtained from the MBS Connection Feedbacks.

Figure 6:
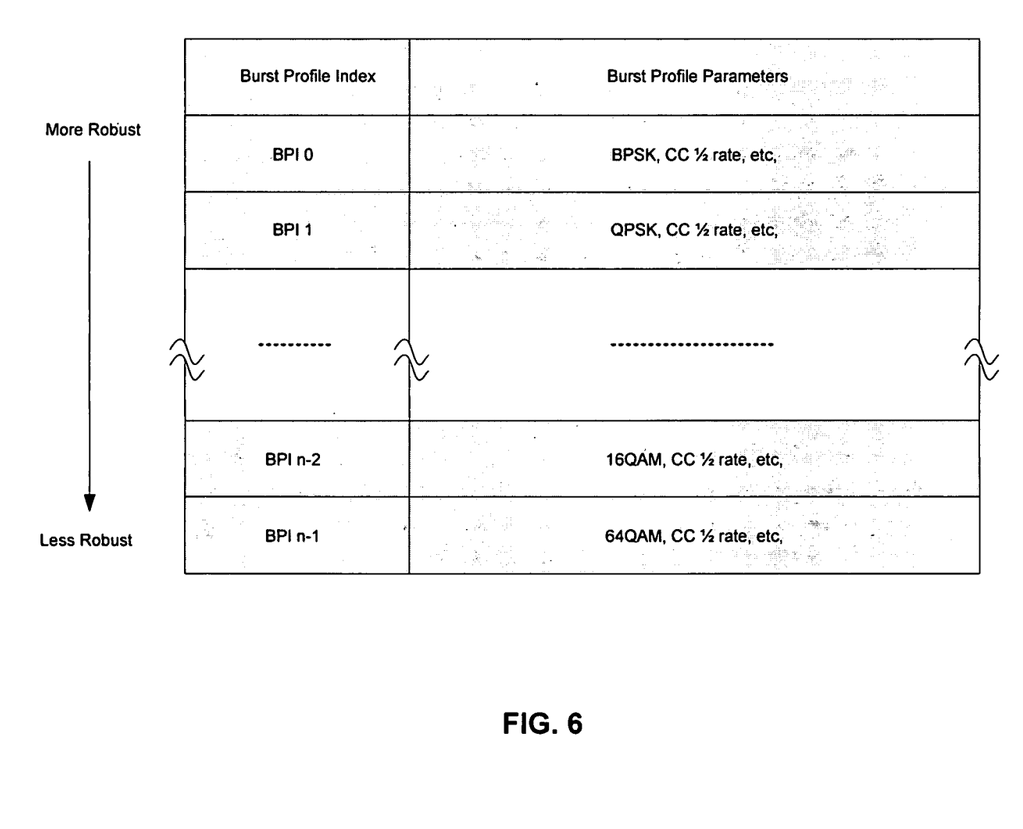
FIG. 6 shows an example of burst profile table that is advertised by the BS.

FIG. 6 shows an example on how burst profiles are defined between BS and SS. The BS may advertise a set of burst profiles that it can support to the SS. The set of burst profiles may be listed as a burst profile table with a burst profile index (BPI) identifying each burst profile. The index BFI may be communicated over the air link between BS and the SS to avoid transmitting the complete burst profile, thus reducing the number of bits to be transmitted over the air. As part of the parameters for a burst profile, the BS defines an Entry threshold for the SS to determine its preferred burst profile. In some implementations, the SS measures the downlink channel condition such as received CINR and compares with Entry thresholds of the burst profiles to determine its preferred burst profile.

Figure 7:
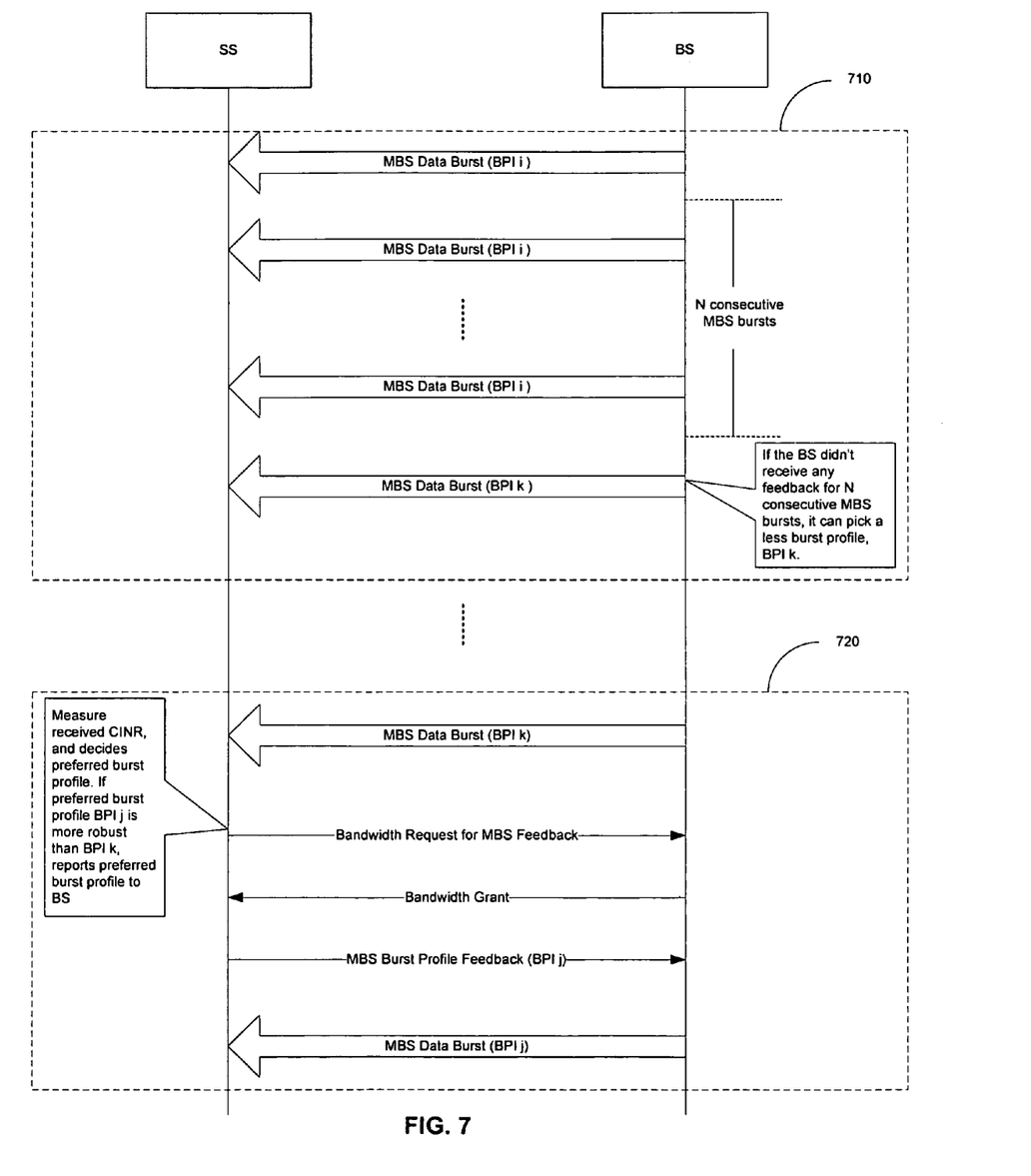
FIG. 7 illustrates an exemplary message flow between a SS and a BS for MBS burst profile management.

FIG. 7 illustrates an exemplary message flow between a SS and a BS for the MBS burst profile management under the second feedback mechanism. The MBS data burst is transmitted by the BS using a default initial burst profile, BPI i, at the starting of the MBS connection. As shown in the block 710, the BS transmitted N MBS data bursts to the SSs without receiving any MBS Burst Profile Feedback. In this scenario, the BS changes the burst profile for the MBS connection from BPI i to BPI k, where BPI k is less robust than BPI i and offers a higher data rate. The next MBS data burst is transmitted by the BS using BPI k. In 720, the SS receives a MBS data burst with BPI k. In parallel with the operation by the BS, the SS also operates to determine its preferred burst profile, BPI j, based on the measured CINR of the received data from the BS. If BPI j is more robust than BPI k used by the BS, the SS sends a Bandwidth Request to the BS to get uplink allocation to transmit MBS Burst Profile Feedback. After the Bandwidth Grant is received from the BS, the SS sends MBS Burst Profile Feedback with BPI j. Upon receiving MBS Burst Profile Feedback from the SS, the BS may decide to update its MBS burst profile based on the one reported by the SS. Hence, the next MBS data burst is transmitted using BPI j. If multiple MBS Burst Profile Feedbacks are received from various SSs, the BS selects the most robust burst profile in all feedbacks.

In implementations, the above described techniques and their variations may be implemented as computer software instructions or firmware instructions. Such instructions may be stored in an article with one or more machine-readable storage media or stored in one or more machine-readable storage devices connected to one or more computers. In operation, the instructions are executed by, e.g., one or more computer processors, to cause the machine to perform the described functions and operations. For example, the techniques for processing the feedbacks from SSs and selecting the suitable burst profile in the downlink MBS channel may be implemented as computer instructions stored in the base stations or a control module that controls base stations. The techniques for generating the NACK messages or the MBS burst profile feedback via the MAC message or header may be implemented as computer instructions stored in the subscriber stations.

Only a few implementations and examples are described, however other variations, modification and enhancements are possible.

What is claimed is:

1. A method for providing a multicast/broadcast service (MBS) in a wireless OFDM/OFDMA system, comprising:

operating a base station to transmit a scheduled MBS transmission to a plurality of subscriber stations over a single traffic channel based on a first data rate;

causing a subscriber station to generate a negative acknowledgement (NACK) indication when the subscriber station fails to receive the scheduled MBS transmission from the base station;

providing an uplink communication channel for the subscriber station to transmit the NACK indication to the base station which processes the NACK indication in determining a second data rate to be used in a subsequent MBS transmission to the plurality of subscriber stations over the single traffic channel based on the second data rate;

applying a hash algorithm to a medium access control (MAC) address of the subscriber station to evenly assign different time and frequency components in the uplink communication channel to the subscriber station;

operating the subscriber station to transmit one of a plurality of orthogonal codewords when indicating the NACK to the base station; and operating the base station to select the second data rate based on received information on the NACK indication from the plurality of subscribe stations that share the single traffic channel, including a service outage percentage among the plurality of subscribe stations during prior MBS transmission based on the first data rate, and to use the single traffic channel to send the subsequent MBS transmission to the plurality of subscriber stations at the second data rate, wherein the second data rate is less than the first data rate when the service outage percent is greater than or equal to a high outage percentage value;
the second data rate is greater than the first data rate when a number of consecutive MBS transmissions are successfully received or when the service outage percent is less than or equal to a low percentage value;
otherwise the second data rate is equal to the first data rate.

2. The method as in claim 1, further comprising using the uplink communication channel to further transmit a negative acknowledgement indication from at least another subscriber station that receives the MBS transmission from the base station.

3. The method as in claim 2, further comprising making the uplink communication channel scalable in either or both the time domain and frequency domain to accommodate the number of subscriber stations participating in the MBS.

4. The method as in claim 2, further comprising allocating different time and frequency components in the uplink communication channel to carry different negative acknowledgement indications from different subscriber stations involved in the MBS from the base station.

5. The method as in claim 2, further comprising using orthogonal codewords to represent different negative acknowledgement indications from different subscriber stations within a common time slot in the uplink communication channel.

6. The method as in claim 2, further comprising applying a hashing algorithm to MAC addresses of different subscriber stations to generate different codewords to represent different negative acknowledgement indications from the different subscriber stations in the uplink communication channel.

7. A method for providing a multicast/broadcast service (MBS) in a wireless OFDM/OFDMA system, comprising:
causing a base station, that sends an MBS transmission to a plurality of subscriber stations over a single traffic channel shared by the subscriber stations, to receive uplink signals from the subscriber stations and to detect a negative acknowledgement (NACK) indication from each subscriber station that fails to receive the MBS transmission from the base station, wherein the uplink signals are transmitted by subscriber stations using time and frequency components based on applying a hash algorithm to medium control access (MAC) addresses of the subscriber stations;
causing the base station to process the received NACK indication from the each subscriber station to generate a service outage percentage used in determining a burst profile for a subsequent MBS transmission to all of the subscriber stations over the single traffic channel; and
operating the base station to use the single traffic channel to use the determined burst profile based on the received NACK indication from all of the subscriber stations in the subsequent MBS transmission to all of the subscriber stations; wherein
the burst profile for the subsequent MBS transmission is more robust than that of a previous MBS transmission when the service outage percent is greater than or equal to a high outage percentage value;
the burst profile for the subsequent MBS transmission is less robust than that of the previous MBS transmission when a number of consecutive MBS transmissions are successfully received or when the service outage percent is less than or equal to a low percentage value;
otherwise the burst profile for the subsequent MBS transmission is same as that of the previous MBS transmission.

8. The method as in claim 7, further comprising:
causing the base station to select the burst profile for the subsequent MBS transmission when the base station fails to receive an NACK indication from the subscriber stations after a selected time period has passed, wherein the burst profile indicates a higher transmission data rate than indicated by a burst profile used for the MBS transmission.

9. The method as in claim 7, further comprising:
determining a percentage of a number of NACK indications received by the base station out of a number of the subscriber stations in response to the MBS transmission; and
using the percentage as a parameter in determining the burst profile for the subsequent MBS transmission.

10. The method as in claim 9, further comprising:
changing the burst profile used by the base station for a MBS transmission to a more robust burst profile when the percentage exceeds a high percentage threshold; and
changing the burst profile used by the base station for a MBS transmission to a less robust burst profile when the percentage is less than a low percentage threshold.

11. A method as in claim 7, wherein the burst profile comprises one or more parameters that describes one or more transmission properties, respectively, and wherein the MBS transmission comprises first information content, and wherein the subsequent MBS transmission comprises second, different information content.

12. A system for providing a multicast/broadcast service (MBS) in a wireless OFDM/OFDMA network, comprising:
a base station operable to transmit a scheduled MBS transmission to a plurality of subscriber stations over a single traffic channel based on a first data rate;
a subscriber station, operable to generate a negative acknowledgement (NACK) indication when the subscriber station fails to receive the scheduled MBS transmission from the base station;
an uplink communication channel for the subscriber station to transmit the NACK indication to the base station which processes the NACK indication in determining a second data rate to be used in a subsequent MBS transmission to the plurality of subscriber stations over the single traffic channel based on the second data rate;
the subscriber station further configured to apply a hash algorithm to a medium access control (MAC) address of the subscriber station to evenly assign different time and frequency components in the uplink communication channel to the subscriber station, and to transmit one of a plurality of orthogonal codewords when indicating the NACK to the base station; and
the base station further operable to select the second data rate based on received information on the NACK indication from the plurality of subscribe stations that share the single traffic channel, including a service outage percentage among the plurality of subscribe stations during prior MBS transmission based on the first data rate, and to use the single traffic channel to send the subsequent MBS transmission to the plurality of subscriber stations at the second data rate, wherein
the second data rate is less than the first data rate when the service outage percent is greater than or equal to a high outage percentage value;
the second data rate is greater than the first data rate when a number of consecutive MBS transmissions are successfully received or when the service outage percent is less than or equal to a low percentage value;
otherwise the second data rate is equal to the first data rate.

13. The system as in claim 12, wherein the uplink communication channel is usable to further transmit a negative acknowledgement indication from at least another subscriber station that receives the MBS transmission from the base station.

14. The system as in claim 13, wherein the uplink communication channel is scalable in either or both the time domain and frequency domain to accommodate the number of subscriber stations participating in the MBS.

15. The system as in claim 13, wherein the base station allocates different time and frequency components in the uplink communication channel to carry different negative acknowledgement indications from different subscriber stations involved in the MBS from the base station.

16. The system as in claim 13, further comprising orthogonal codewords to represent different negative acknowledgement indications from different subscriber stations within a common time slot in the uplink communication channel.

17. The system as in claim 13, further comprising a hashing algorithm appliable to MAC addresses of different subscriber stations to generate different codewords to represent different negative acknowledgement indications from the different subscriber stations in the uplink communication channel.

18. A system for providing a multicast/broadcast service (MBS) in a wireless OFDM/OFDMA network, comprising:
   a base station, which sends an MBS transmission to a plurality of subscriber stations over a single traffic channel shared by the subscriber stations, to receive uplink signals from the subscriber stations and to detect a negative acknowledgement (NACK) indication from each subscriber station that fails to receive the MBS transmission from the base station, wherein the uplink signals are transmitted by subscriber stations using time and frequency components based on applying a hash algorithm to medium control access (MAC) addresses of the subscriber stations;
   the base station further to process the received NACK indication from the each subscriber station to generate a service outage percentage used in determining a burst profile for a subsequent MBS transmission to all of the subscriber stations over the single traffic channel; and
   the base station further to use the single traffic channel to use the determined burst profile based on the received NACK indication from all of the subscriber stations in the subsequent MBS transmission to all of the subscriber stations; wherein
   the burst profile for the subsequent MBS transmission is more robust than that of a previous MBS transmission when the service outage percent is greater than or equal to a high outage percentage value;
   the burst profile for the subsequent MBS transmission is less robust than that of the previous MBS transmission when a number of consecutive MBS transmissions are successfully received or when the service outage percent is less than or equal to a low percentage value;
   otherwise the burst profile for the subsequent MBS transmission is same as that of the previous MBS transmission.

19. The system as in claim 18, wherein:
   the base station is further to select the burst profile for the subsequent MBS transmission when the base station fails to receive an NACK indication from the subscriber stations after a selected time period has passed, wherein the burst profile indicates a higher transmission data rate than indicated by a burst profile used for the MBS transmission.

20. The system as in claim 18, wherein the base station further:
   determines a percentage of a number of NACK indications received by the base station out of a number of the subscriber stations in response to the MBS transmission; and
   determines, using the percentage as a parameter, the burst profile for the subsequent MBS transmission.

* * * * *